Figures 1, 2:
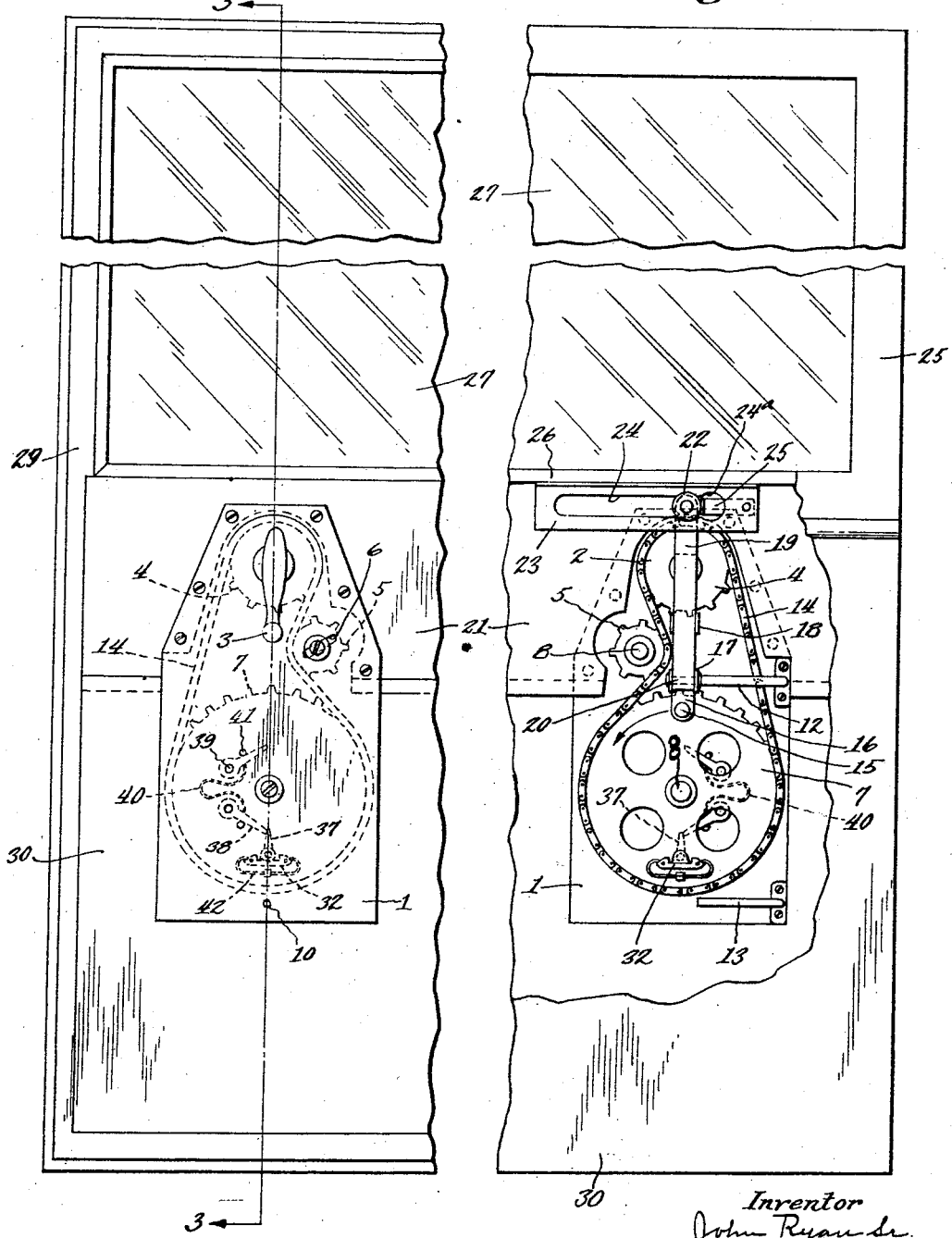

Aug. 18, 1925.

J. RYAN, SR 1,550,637

DEVICE FOR OPENING AND CLOSING WINDOWS OF MOTOR VEHICLES, ETC

Filed Jan. 19, 1923   3 Sheets-Sheet 1

Inventor
John Ryan Sr.
By
John A. Bonnhardt
Att'y

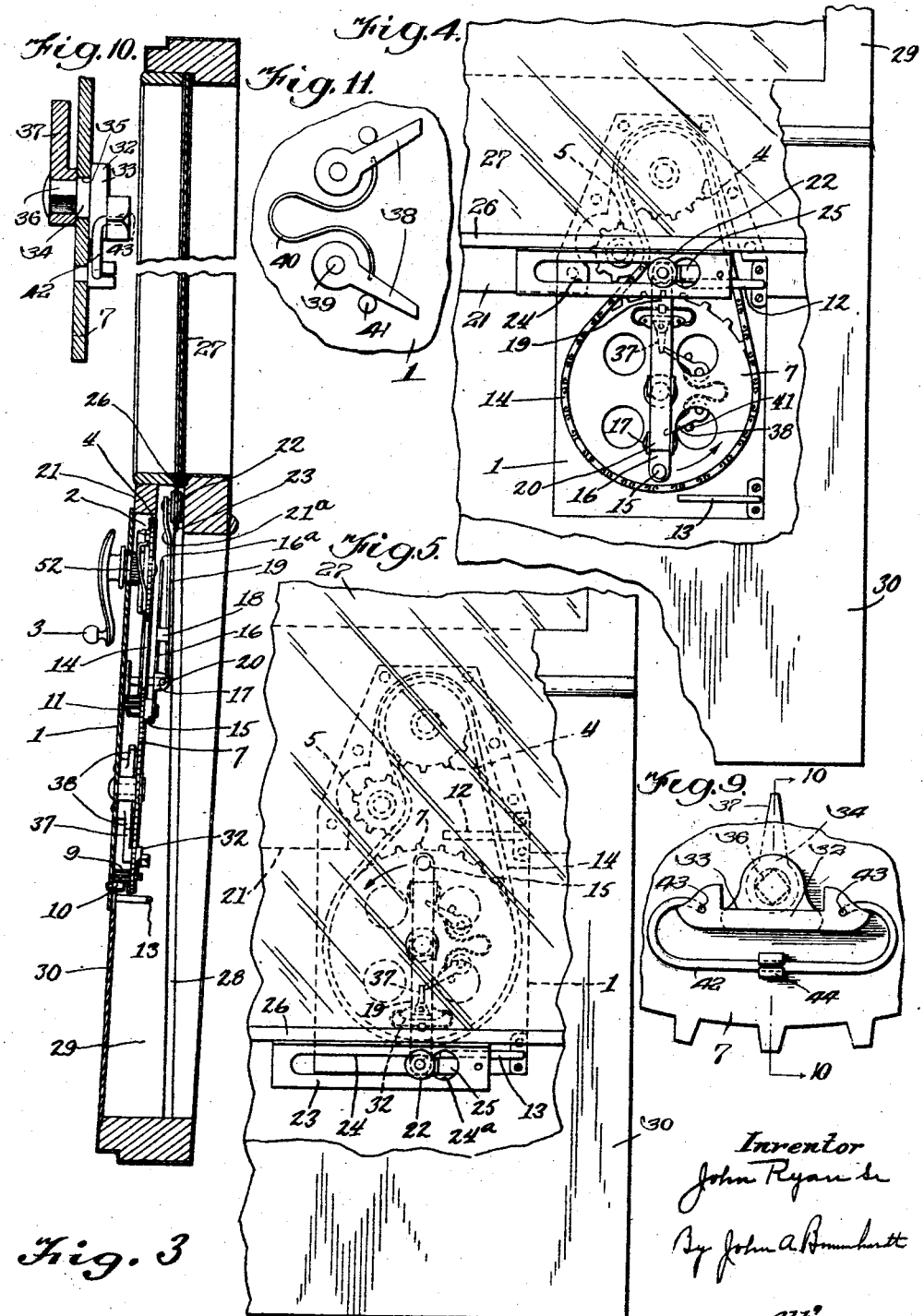

Aug. 18, 1925.
J. RYAN, SR
1,550,637
DEVICE FOR OPENING AND CLOSING WINDOWS OF MOTOR VEHICLES, ETC
Filed Jan. 19, 1923
3 Sheets-Sheet 3
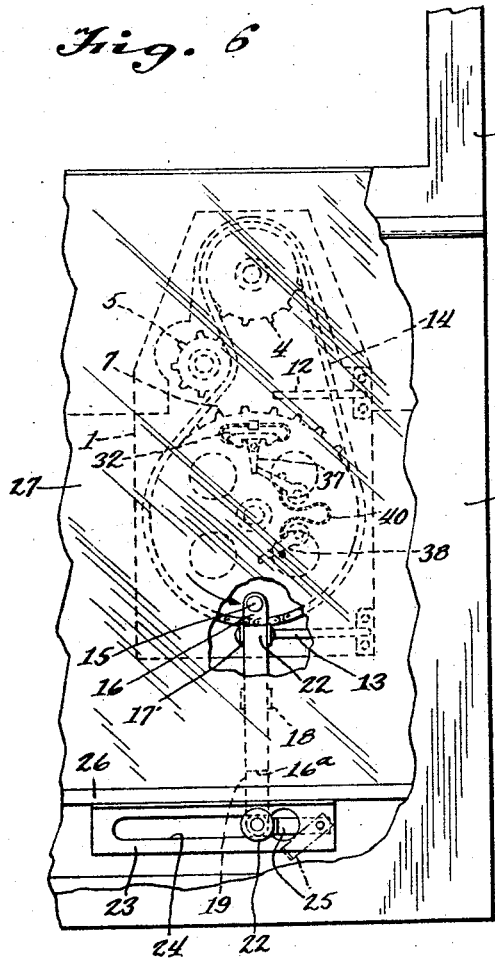
Fig. 6
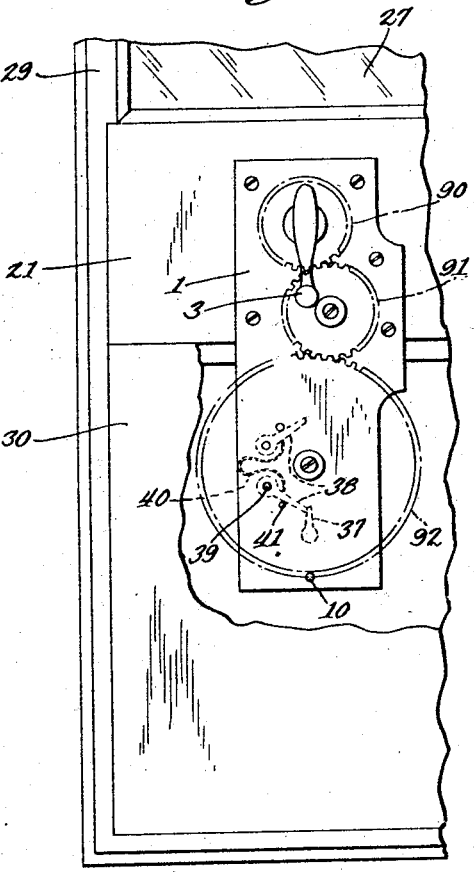
Fig. 12.
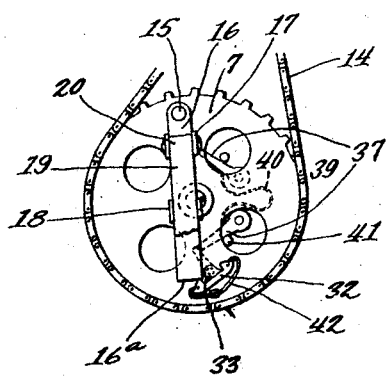
Fig. 7
Fig. 8
Inventor
John Ryan Sr.
By John A. Bernhardt
Atty Patented Aug. 18, 1925.

1,550,637

UNITED STATES PATENT OFFICE.

JOHN RYAN, SR., OF CLEVELAND, OHIO, ASSIGNOR TO HELEN A. RYAN, OF CLEVELAND, OHIO.

DEVICE FOR OPENING AND CLOSING WINDOWS OF MOTOR VEHICLES, ETC.

Application filed January 19, 1923. Serial No. 613,640.

To all whom it may concern:

Be it known that I, JOHN RYAN, Sr., a citizen of the United States, residing at Cleveland, in the county of Cuyahoga and State of Ohio, have invented certain new and useful Improvements in Devices for Opening and Closing Windows of Motor Vehicles, Etc., of which the following is a specification.

This invention relates to devices for raising and lowering windows, and is particularly useful in connection with the windows of motor vehicles, although it may be applied in other relations if desired. The mechanism includes a lock by means of which its operation can be prevented or controlled.

In the accompanying drawings, Fig. 1 is an inside elevation of a vehicle door with the lining removed and parts broken away, showing the device applied thereto. Fig. 2 is an outside elevation of the door with parts broken away. Fig. 3 is a vertical section on line 3—3 of Fig. 1. Fig. 4 is an outside elevation of the door with parts broken away showing the window partly lowered. Fig. 5 is a similar view showing the window lowered to another position. Fig. 6 is a similar view showing the window completely lowered. Fig. 7 is a detail view showing the catch disengaging the connecting link. Fig. 8 is a detail view showing the counter-balance spring. Fig. 9 is a detail of the connecting link catch. Fig. 10 is a section on line 21—21 of Fig. 9. Fig. 11 is a detail of the catch tripping arms. Fig. 12 shows a modified form of devices wherein gears are substituted for sprockets and chain.

In the drawings, 1 indicates a base or back plate, to which the lock, indicated as a whole at 2, is applied. 3 is a crank handle mounted on the squared stem 47 of a stub shaft 45, which has a spacing shoulder 46, and this shaft is provided with a sprocket 4 connected by a chain 14 with a sprocket wheel 7, the chain being held in tension by an idler sprocket 5 the shaft of which is adjustable in slot 6 in the plate 1, the sprocket 7 being mounted on a stud 8. A counter-balance coiled spring 9 is connected at one end to a pin 10 on the plate 1 and at the other end to a pin 11 on the sprocket 7; and upper and lower stop arms 12 and 13 project from the plate 1 to limit the movement of the operating devices as hereinafter described.

A wrist pin 15 projects from the sprocket 7 and carries a connecting link 16 the end 16ª of which is adapted to be engaged by a catch 32. The link 16 has a pair of hinge ears 17 projecting therefrom, and also a pair of guide ears 18 for an extension link 19 which is hinged at 20 to the ears 17 and is offset at its free end as indicated at 21ª and carries a roller 22 which travels in a slot 24 in an angle plate 23 which is secured to the channel frame 26 of the window pane 27, the end of the slot 24 being enlarged as indicated at 24ª to admit the roller 22, a spring stop 25 extending across the enlarged end 24ª of the slot.

The window slides in the guide-ways 28 in pillars 29 of the vehicle door 30, in the embodiment described, this door having a lock board 21 at the inner side thereof.

The link catch 32 is shown particularly in Fig. 20, and has a jaw member 33 mounted on a stud 34 having pivotal movement in a hole 35 in the sprocket 7, diametrically opposite the wrist pin 15. The squared end 36 of the stud 34 carries a trip toe 37 which is tripped by arms or dogs 38 pivoted by pins 39 to the inner side of the plate 1, a spring 40 holding the dogs 38 in tripping position against stop pins 41 on the plate. A clasp spring 42, with its ends secured to opposite ends of the jaw 33 as indicated at 43, holds the catch in normal position, the spring being attached to the sprocket 7 by a stud 44.

The window is raised and lowered in its guides by operation of the crank handle 3 and the parts operatively connected thereto, and the action of the parts already described is as follows:

To lower the window, the crank handle 3 is turned clock-wise as viewed in Fig. 1, and when the window is closed the parts are in position shown in Fig. 2. Upon rotation of the handle until the sprocket 7 makes a half revolution in the direction indicated by the arrow in Fig. 2, by means of the sprocket 4 and chain 14, the wrist pin 15 is brought to its lower position, and the catch 32 to its upper position, the window being pulled down accordingly as shown in Fig. 4. The end 16ª of the connecting link 16 then snaps into engagement with the catch 32 by riding between the jaws 33 thereof, the link being of a length just sufficient to snap between said jaws as the catch is brought to its upper position. Upon further rotation of the handle 3, the sprocket 7, when completing one revolution, swings the parts into the position shown in Fig. 5, thereby pulling down the window further by means of the connection through the link 19 and the roller 22 working in the slot 24. In this position the trip toe 37 is now in contact with the lower dog 38 and at the start of the next and last half revolution of the wheel 7 the toe 37 is rocked by the dog, as shown in Fig. 7, the jaw 33 releasing the end 16ᵃ of the connecting link 16, the jaw 33 being then returned to normal position by the spring 42. At the end of one and one-half revolutions of the sprocket 7 the window is completely lowered, the parts being in the position shown in Fig. 6, the links having swung completely around to lower position, and further movement is prevented by the hinge ear 17 striking against the stop arm 13, the effective rigid connection between the sprocket and the links being broken when the catch 32 releases the connecting link 16, and this action also winds the counter-balance spring 9 to greater tension.

To close the window again, the handle 3 is turned counter-clockwise until the sprocket 7 makes one and one-half revolutions, bringing the parts back by reverse operation to the position shown in Fig. 2. Further reverse movement is prevented by the opposite side of the hinge ear 17 stopping against the upper stop arm 12. The tension of the counter-balance spring 9 assists the sprocket 7 in turning in reverse direction to raise and close the window.

The important feature of the hinged extension link 19 is that it makes unnecessary the installation of the mechanism absolutely parallel to the window slideways 28, thereby greatly simplifying the installation, the hinge permitting sufficient lateral movement of the link 19 to accommodate the direction of the slideways, this movement being permitted by the hinge 20 and the guide ears 18, the latter engaging opposite sides of the link 19 to swing the latter.

During the first part of the turn of the wheel 7 the links act as a connecting rod between the wrist pin and the window, and pull the window part way down (or up) and when the free end 16ᵃ of the link 16 is picked up by the catch 33 the links then swing as a lever to continue the movement of the window, the roller 22 traveling in the slot 24, and then the catch is released, and the links then operate as a connecting rod to complete the movement.

Various modifications are possible within the scope of the invention. Thus, instead of chain and sprocket gearing between the crank handle and the wheel 7, gears 90, 91 and 92 may be provided as shown in Fig. 12, forming a train of gearing which will produce the same result.

I claim:

1. A window operating device comprising a wheel, a link connection from the wheel to the window, a catch carried by the wheel and engageable with the link to swing the same as a lever, and means to automatically disengage the catch from the link at a certain point in the rotation of the wheel.

2. A window operating device comprising a wheel, a link connection from the wheel to the window, a catch carried by the wheel and engageable with the link to swing the same as a lever, and means to automatically disengage the catch from the link at a certain point in the rotation of the wheel, said means including a dog supported adjacent the wheel, and a trip connected to the catch and arranged to strike the dog.

3. A window operating device comprising a wheel, means to turn the same, a link structure having a wrist pin connection at one end to the wheel and a sliding connection at the other end to the window and adapted to act as a connecting rod during part of the rotation of the wheel, and means carried by the wheel to engage the link structure and transform the same into a lever for operating the window during another part of the rotation of the wheel.

4. A window operating device comprising a wheel, means to turn the same, a link structure having a wrist pin connection at one end to the wheel and a sliding connection at the other end to the window and adapted to act as a connecting rod during part of the rotation of the wheel, and means carried by the wheel to engage the link structure and transform the same into a lever for operating the window during another part of the rotation of the wheel, the last mentioned means including a catch carried by the wheel at a point opposite the wrist pin connection, said catch being automatically engageable with the link structure at a certain point in the rotation of the wheel, and means to automatically disengage said catch at another point in the rotation of the wheel.

5. A window operating device comprising a wheel, means to turn the same, a link structure having a wrist pin connection at one end to the wheel and a sliding connection at the other end to the window and adapted to act as a connecting rod during part of the rotation of the wheel, and means carried by the wheel to engage the link structure and transform the same into a lever for operating the window during another part of the rotation of the wheel, the last mentioned means including a catch carried by the wheel at a point opposite the wrist pin connection, said catch being automatically engageable with the link structure at a certain point in the rotation of the wheel, and means to automatically disengage said catch at another point in the rotation of the wheel, said catch and disengaging means being operable in either direction of the rotation of the wheel.

6. A window operating device comprising a wheel provided with means to turn the same, and a connection between the wheel and the window, said connection including a link having a wrist pin connection to the wheel, and another link hinged at one end to said link for lateral movement and having a pivotal connection at the other end to the window.

7. A window operating device comprising a wheel provided with means to turn the same, and a connection between the wheel and the window, said connection including a link having a wrist pin connection to the wheel, and another link hinged at one end to said link for lateral movement and having a pivotal connection at the other end to the window, the last mentioned connection including a slotted plate attached to the window and a roller on the link, traveling in said slot.

8. A window operating device, comprising the combination with a sliding window, of a wheel, means to turn the wheel, a link section having a wrist pin connection to the wheel, another link section hinged for lateral movement to the first mentioned section and having a pivot connection to the window, and stops positioned to engage one of said links and limit the turn of the wheel in either direction.

9. A window operating device comprising, in combination, a sliding window, a wheel which may be turned in either direction, a link structure having at one end a wrist pin connection to the wheel and at the other end a sliding pivot connection to the window, a double acting catch carried by the wheel at a point diametrically opposite the wrist pin connection and engageable with the link structure at a certain point in the rotation of the wheel to transform said link into a lever carried by the wheel, a trip projecting from the catch, and a pair of dogs supported beside the wheel and respectively engageable with the trip at another point in the rotation of the wheel in either direction, to disengage the catch and restore the normal link connection between the wheel and the window.

10. A window operating device comprising, in combination, a sliding window, a wheel which may be turned in either direction, a link structure having at one end a wrist pin connection to the wheel and at the other end a sliding pivot connection to the window, a double acting catch carried by the wheel at a point diametrically opposite the wrist pin connection and engageable with the link structure at a certain point in the rotation of the wheel to transform said link into a lever carried by the wheel, a trip projecting from the catch, and a pair of dogs supported beside the wheel and respectively engageable with the trip at another point in the rotation of the wheel in either direction, to disengage the catch and restore the normal link connection between the wheel and the window, said catch including a pair of yielding jaws between which the link structure is engageable.

In testimony whereof, I affix my signature.

JOHN RYAN, Sr.